US012556782B2

(12) United States Patent
Zhang

(10) Patent No.: US 12,556,782 B2
(45) Date of Patent: Feb. 17, 2026

(54) MULTIMEDIA PROCESSING METHOD AND APPARATUS, AND DEVICE, AND MEDIUM

(71) Applicant: Beijing Zitiao Network Technology Co., Ltd., Beijing (CN)

(72) Inventor: Longtao Zhang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/713,112

(22) PCT Filed: Nov. 2, 2022

(86) PCT No.: PCT/CN2022/129137
§ 371 (c)(1),
(2) Date: May 23, 2024

(87) PCT Pub. No.: WO2023/093474
PCT Pub. Date: Jun. 1, 2023

(65) Prior Publication Data
US 2025/0030926 A1    Jan. 23, 2025

(30) Foreign Application Priority Data
Nov. 24, 2021  (CN) .......................... 202111406380.5

(51) Int. Cl.
*H04N 21/81*   (2011.01)
*G06T 1/20*    (2006.01)
*H04N 21/845*  (2011.01)

(52) U.S. Cl.
CPC ........... *H04N 21/8193* (2013.01); *G06T 1/20* (2013.01); *H04N 21/8455* (2013.01)

(58) Field of Classification Search
CPC ..................................................... H04N 21/08
(Continued)

(56) References Cited

U.S. PATENT DOCUMENTS

| 2015/0169361 | A1  | 6/2015 | Busaba et al. |
| 2020/0257514 | A1* | 8/2020 | Gadgil .................... H04L 67/34 |
| 2021/0149597 | A1* | 5/2021 | Kim ...................... G06F 3/0679 |

FOREIGN PATENT DOCUMENTS

| CN | 103888771 A | 6/2014 |
| CN | 106797388 A | 5/2017 |

(Continued)

OTHER PUBLICATIONS

International Patent Application No. PCT/CN2022/129137; Int'l Written Opinion and Search Report; dated Jan. 28, 2023; 6 pages.

(Continued)

*Primary Examiner* — Amir Shahnami
(74) *Attorney, Agent, or Firm* — BakerHostetler

(57) ABSTRACT

The embodiments of the present disclosure relate to a multimedia processing method and apparatus, and a device and a medium. The method is applied to a terminal, and comprises: acquiring first multimedia data, wherein the first multimedia data comprises at least one of frame data and an image of a video; storing the first multimedia data in a shared memory, and dividing the first multimedia data into at least two first data blocks, wherein each first data block has memory information in the shared memory; on the basis of the memory information of the at least two first data blocks in the shared memory, respectively calling and processing the at least two first data blocks by means of at least two computing devices which are comprised in a terminal, so as to obtain at least two second data blocks, wherein each computing device processes one first data block; and splicing the at least two second data blocks to obtain second multimedia data, and then displaying the second multimedia data.

20 Claims, 3 Drawing Sheets

(58) Field of Classification Search
USPC .................................................. 375/240.25
See application file for complete search history.

(56) References Cited

FOREIGN PATENT DOCUMENTS

| | | | |
|---|---|---|---|
| CN | 106951322 | A | 7/2017 |
| CN | 107680030 | A | 2/2018 |
| CN | 107945098 | A | 4/2018 |
| CN | 111274049 | A | 6/2020 |
| CN | 112385225 | A | 2/2021 |
| CN | 112991172 | A | 6/2021 |

OTHER PUBLICATIONS

China Patent Application No. 202111406380.5; Office Action; dated Mar. 28, 2025; 14 pages.

* cited by examiner

MULTIMEDIA PROCESSING METHOD AND APPARATUS, AND DEVICE, AND MEDIUM

CROSS-REFERENCE TO RELATED APPLICATIONS

This application is a U.S. National Stage under 35 U.S.C. § 371 of International Application No. PCT/CN2022/129137, filed on Nov. 2, 2022, which is based on and claims priority to Chinese Application No. 202111406380.5, filed on Nov. 24, 2021, the disclosure of each of these applications is incorporated herein by reference in its entirety.

TECHNICAL FIELD

The present disclosure relates to the field of image processing technologies, and in particular, to a multimedia processing method and apparatus, a device, and a medium.

BACKGROUND ART

With the development of intelligent terminals and video processing technologies, there is a strong demand for consuming videos or images on the intelligent terminals. As screen resolution becomes increasingly high, common videos or images can no longer satisfy people's viewing demands.

SUMMARY OF THE INVENTION

In order to solve the above technical problem or at least partially solve the above technical problem, the present disclosure provides a multimedia processing method and apparatus, a device, and a medium.

An embodiment of the present disclosure provides a multimedia processing method, which is applied to a terminal and includes:
  obtaining first multimedia data, the first multimedia data including at least one of frame data of a video or an image;
  storing the first multimedia data in a shared memory, and dividing the first multimedia data into at least two first data chunks, where each of the first data chunks has its memory information in the shared memory;
  respectively calling and processing, by using at least two computing devices included in the terminal, the at least two first data chunks based on the memory information of the at least two first data chunks in the shared memory, to obtain at least two second data chunks, where each computing device processes one first data chunk; and
  concatenating the at least two second data chunks to obtain second multimedia data, and displaying the second multimedia data.

An embodiment of the present disclosure further provides a multimedia processing apparatus, which is configured in a terminal and includes:
  a data obtaining module configured to obtain first multimedia data, the first multimedia data including at least one of frame data of a video or an image;
  a data division module configured to store the first multimedia data in a shared memory, and divide the first multimedia data into at least two first data chunks, where each of the first data chunks has its memory information in the shared memory;
  a data processing module configured to respectively call and process, by using at least two computing devices included in the terminal, the at least two first data chunks based on the memory information of the at least two first data chunks in the shared memory, to obtain at least two second data chunks, where each computing device processes one first data chunk; and
  a data display module configured to concatenate the at least two second data chunks to obtain second multimedia data, and display the second multimedia data.

An embodiment of the present disclosure further provides an electronic device. The electronic device includes: a processor; and a memory configured to store instructions executable by the processor, where the processor is configured to read the executable instructions from the memory and execute the instructions to implement the multimedia processing method provided in the embodiments of the present disclosure.

An embodiment of the present disclosure further provides a computer-readable storage medium storing a computer program, the computer program being used to perform the multimedia processing method provided in the embodiments of the present disclosure.

Compared to the related art, the technical solutions provided in the embodiments of the present disclosure have the following advantages: in the multimedia processing solution provided in the embodiments of the present disclosure, the first multimedia data is obtained, the first multimedia data including at least one of the frame data of the video and the image; the first multimedia data is stored in the shared memory, and the first multimedia data is divided into the at least two first data chunks, where each of the first data chunks has its memory information in the shared memory; the at least two first data chunks are respectively called and processed, by using the at least two computing devices included in the terminal, based on the memory information of the at least two first data chunks in the shared memory, to obtain the at least two second data chunks, where each computing device processes one first data chunk; and the at least two second data chunks are concatenated to obtain the second multimedia data, and the second multimedia data is displayed.

BRIEF DESCRIPTION OF DRAWINGS

The foregoing and other features, advantages, and aspects of embodiments of the present disclosure become more apparent with reference to the following specific implementations and in conjunction with the drawings. Throughout the drawings, the same or similar reference numerals denote the same or similar elements. It should be understood that the drawings are schematic and that parts and elements are not necessarily drawn to scale.

DETAILED DESCRIPTION OF THE INVENTION

Figure 1:
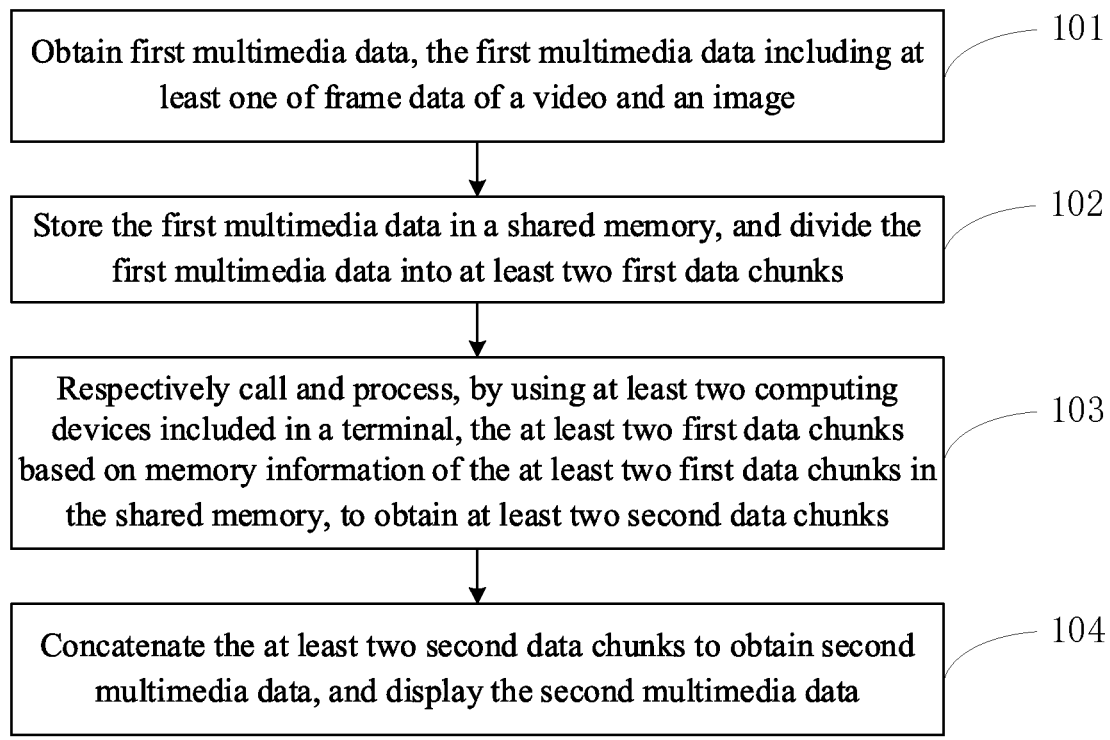
FIG. 1 is a schematic flowchart of a multimedia processing method according to an embodiment of the present disclosure.

Embodiments of the present disclosure are described in more detail below with reference to the drawings. Although some embodiments of the present disclosure are shown in the drawings, it should be understood that the present disclosure may be implemented in various forms and should not be construed as being limited to the embodiments set forth herein. Rather, these embodiments are provided for a more thorough and complete understanding of the present disclosure. It should be understood that the drawings and the embodiments of the present disclosure are only for exemplary purposes, and are not intended to limit the scope of protection of the present disclosure.

It should be understood that the various steps described in the method implementations of the present disclosure may be performed in different orders, and/or performed in parallel. Furthermore, additional steps may be included and/or the execution of the illustrated steps may be omitted in the method implementations. The scope of the present disclosure is not limited in this respect.

The term "include/comprise" used herein and the variations thereof are an open-ended inclusion, namely, "include/comprise but not limited to". The term "based on" is "at least partially based on". The term "an embodiment" means "at least one embodiment". The term "another embodiment" means "at least one another embodiment". The term "some embodiments" means "at least some embodiments". Related definitions of the other terms will be given in the description below.

It should be noted that concepts such as "first" and "second" mentioned in the present disclosure are only used to distinguish different apparatuses, modules, or units, and are not used to limit the sequence of functions performed by these apparatuses, modules, or units or interdependence.

It should be noted that the modifiers "one" and "a plurality of" mentioned in the present disclosure are illustrative and not restrictive, and those skilled in the art should understand that unless the context clearly indicates otherwise, the modifiers should be understood as "one or more".

The names of messages or information exchanged between a plurality of apparatuses in the implementations of the present disclosure are used for illustrative purposes only, and are not used to limit the scope of these messages or information.

In the related art, algorithmic techniques such as a video super-resolution algorithm may be used to improve resolution and definition of videos or images, and multi-thread parallel processing may be performed to improve processing efficiency. However, when an algorithm has a high computational complexity, the processing efficiency still cannot satisfy the requirements.

In order to solve the technical problem in the related art that the multimedia processing efficiency cannot satisfy the requirements, an embodiment of the present disclosure provides a multimedia processing method. The method is described below with reference to specific embodiments.

FIG. 1 is a schematic flowchart of a multimedia processing method according to an embodiment of the present disclosure. The method may be performed by a multimedia processing apparatus, where the apparatus may be implemented using software and/or hardware and may generally be integrated into an electronic device. As shown in FIG. 1, the method is applied to a terminal and includes the following steps.

Step 101: Obtain first multimedia data, the first multimedia data including at least one of frame data of a video or an image.

The first multimedia data may be any multimedia data that requires image quality enhancement. The first multimedia data may include at least one of frame data of a video or an image, where the frame data may be understood as data of a video frame obtained by decoding the video. This embodiment of the present disclosure imposes no limitation on a file format or a source of the first multimedia data. For example, the first multimedia data may be an image obtained by real-time shooting, or may be frame data of a video or an image downloaded from the Internet.

In this embodiment of the present disclosure, when the first multimedia data is the frame data of the video, and at least two computing devices each include a graphics processing unit, obtaining the first multimedia data includes: decoding the video by using the graphics processing unit, to obtain a plurality of texture images, and determining the plurality of texture images as the frame data.

The graphics processing unit (GPU) may be a microprocessor provided in the terminal to perform image- and graphics-related computing. The computing device may be a device provided in the terminal to perform computational processing, and a plurality of computing devices may be provided in the terminal. In the embodiments of the present disclosure, the computing device may include the graphics processing unit, a network processing unit (NPU), a digital signal processor (DSP), an accelerated processing unit (APU), and the like, which is not specifically limited.

Specifically, when the first multimedia data is the frame data of the video, the multimedia processing apparatus may first obtain a video to be processed, then decode the video by using the graphics processing unit, to obtain a plurality of texture images each being determined as the frame data, and then store the frame data in a memory of the GPU. There are no limitations on the decoding method described above. For example, in an Android terminal, the video can be decoded through hard decoding using Open Graphics Library (OpenGL), to obtain the texture images. OpenGL may be a cross-language and cross-platform application programming interface (API) used to render 2D and 3D vector graphics.

Step 102: Store the first multimedia data in a shared memory, and divide the first multimedia data into at least two first data chunks.

The first data chunk may be part of the first multimedia data that is obtained by data chunking, and the first multimedia data may include at least two first data chunks each having its memory information in the shared memory.

In this embodiment of the present disclosure, dividing the first multimedia data into the at least two first data chunks includes: performing data chunking on the first multimedia data based on memory information of the first multimedia data using a pointer offset method, to obtain the at least two first data chunks, a number of the at least two first data chunks being the same as a number of the at least two computing devices.

In this embodiment of the present disclosure, since the memory of the GPU is in the shared memory, the first multimedia data is stored in the shared memory. The shared memory may be a memory structure that can implement memory sharing. For example, in an Android terminal, the shared memory may be EGLImage. EGLImage may represent a shared resource type created by an EGL client API (e.g., OpenGL described above). The memory information of the first multimedia data may be related information of the first multimedia data in the shared memory. In this embodiment of the present disclosure, the memory information of the first multimedia data may include a start position in the shared memory and a data length. A pointer may be a processing pointer of a central processing unit (CPU) that points to a specific memory location in the shared memory. A pointer offset may be a change in the memory location pointed to, i.e., a change in a processing target.

Figure 2:
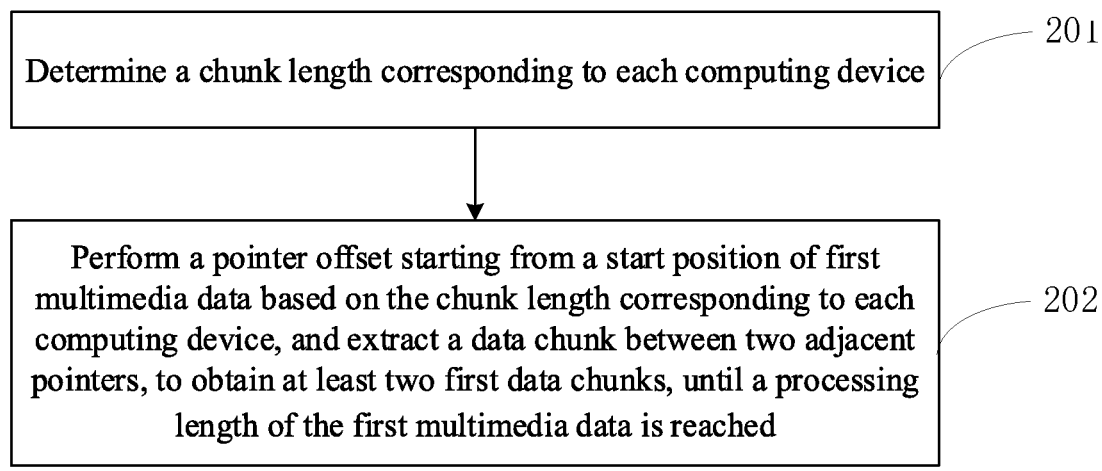
FIG. 2 is a schematic flowchart of another multimedia processing method according to an embodiment of the present disclosure.

For example, FIG. 2 is a schematic flowchart of another multimedia processing method according to an embodiment of the present disclosure. As shown in FIG. 2, in an optional implementation, performing the data chunking on the first multimedia data based on the memory information of the first multimedia data using the pointer offset method, to obtain the at least two first data chunks may include the following steps.

Step 201: Determine a chunk length corresponding to each computing device.

The chunk length may represent a data length of one first data chunk.

In an implementation, determining the chunk length corresponding to each computing device may include: determining the chunk length corresponding to each computing device as a unit length by equal division, the unit length being a result of dividing the data length of the first multimedia data by the number of the at least two computing devices.

The unit length may be a length obtained by equally dividing the data length of the first multimedia data by the number of the plurality of computing devices. Specifically, when determining the chunk length corresponding to each computing device, the multimedia processing apparatus may determine the chunk length corresponding to each computing device as the unit length by equal division. It can be understood that, in this case, since each computing device corresponds to the same chunk length, a same offset length is used for the pointer offset.

In another implementation, determining the chunk length corresponding to each computing device may include: determining, based on a processing speed of each computing device, the chunk length corresponding to the computing device, the processing speed of each computing device being directly proportional to the chunk length.

When determining the chunk length corresponding to each computing device, the multimedia processing apparatus may determine, based on the processing speed of each computing device, the chunk length corresponding to the computing device, where a faster processing speed indicates a larger chunk length, that is, the processing speed of the computing device being directly proportional to the chunk length. It can be understood that, in this case, since each computing device may correspond to a different chunk length, different offset lengths are used for the pointer offset.

Step 202: Perform a pointer offset starting from the start position of the first multimedia data based on the chunk length corresponding to each computing device, and extract a data chunk between two adjacent pointers, to obtain the at least two first data chunks, until a processing length of the first multimedia data is reached.

Specifically, after determining the chunk length corresponding to each computing device, the multimedia processing apparatus performs the pointer offset starting from the start position of the first multimedia data based on the chunk length corresponding to each computing device, with the offset length being the chunk length corresponding to each computing device. Each time a pointer is offset, a data chunk between memory locations corresponding to two adjacent pointers can be extracted to obtain one first data chunk, and the first data chunk has a data length equal to the chunk length. As the pointer is offset a plurality of times, a plurality of first data chunks can be obtained. This stops until the pointer points to a memory location corresponding to the processing length of the first multimedia data.

Step 103: Respectively call and process, by using at least two computing devices included in the terminal, the at least two first data chunks based on the memory information of the at least two first data chunks in the shared memory, to obtain at least two second data chunks.

In this embodiment of the present disclosure, each computing device included in the terminal can access the shared memory described above, that is, memory sharing between the computing devices and of the first multimedia data between the computing devices can be implemented using a system underlying data structure of the terminal, so that a performance loss caused by memory copying during subsequent processing can be reduced. The memory information of each first data chunk in the shared memory includes the chunk length and a chunk start position that a pointer is offset to. Each computing device processes one first data chunk.

In this embodiment of the present disclosure, after dividing the first multimedia data into a plurality of first data chunks, the multimedia processing apparatus can obtain the memory information of each first data chunk in the shared memory, and then send the memory information of each first data chunk in the shared memory to the corresponding computing device, such that each computing device is capable of receiving memory information of one first data chunk in the shared memory, and call and process the corresponding first data chunk in the shared memory based on the memory information, to obtain a second data chunk. As such, the at least two second data chunks are obtained.

It can be understood that a processing algorithm of each computing device for the first data chunk may be any algorithm that can implement image quality enhancement, such as a super-resolution algorithm. The super-resolution algorithm can increase the resolution of a video or an image, improve and generate texture details of the video or the image at the same time, and improve content details and contrast of the video or the image by using an algorithmic technique. For example, the super-resolution algorithm can optimize a standard-definition video to a high-definition video to comprehensively improve the definition and subjective quality of the video, but the super-resolution algorithm has high computational complexity.

Step 104: Concatenate the at least two second data chunks to obtain second multimedia data, and display the second multimedia data.

In this embodiment of the present disclosure, each computing device processes the corresponding first data chunk based on the memory information, to obtain the at least two second data chunks, and then may output each second data chunk to a predetermined location in the shared memory. The multimedia processing apparatus can then concatenate or combine the plurality of second data chunks in the shared memory to obtain the second multimedia data. Then, the graphics processing unit can obtain the second multimedia data from the shared memory, and render and display the second multimedia data on a screen of the terminal. Since the at least two second data chunks are obtained by performing the image quality enhancement on the at least two first data chunks, image quality of the second multimedia data obtained by concatenating the at least two second data chunks is enhanced compared to the first multimedia data, thereby improving the effect of user experience in the image quality of the multimedia data.

According to the multimedia processing solution provided in the embodiments of the present disclosure, the first multimedia data is obtained, the first multimedia data including at least one of the frame data of the video and the image; the first multimedia data is stored in the shared memory, and the first multimedia data is divided into the at least two first data chunks, where each of the first data chunks has its memory information in the shared memory; the at least two first data chunks are respectively called and processed, by using the at least two computing devices included in the terminal, based on the memory information of the at least two first data chunks in the shared memory, to obtain the at least two second data chunks, where each computing device processes one first data chunk; and the at least two second data chunks are concatenated to obtain the second multimedia data, and the second multimedia data is displayed. With the above technical solution, the multimedia data is stored in the shared memory after being subjected to data chunking, then different data chunks can be processed in different computing devices of the terminal based on the memory information of the data chunks in the shared memory, so that the computing capabilities of the computing devices in the terminal can be fully used, to effectively improve the processing efficiency, reduce time consumption of data extraction through the memory sharing between the plurality of computing devices, and reduce a performance loss, thereby improving the effect of user experience in the image quality of the multimedia data.

In some embodiments, the multimedia processing method may further include: implementing memory sharing of the first multimedia data between the at least two computing devices via a multi-device buffer object interface, such that each computing device is capable of accessing the first multimedia data in the shared memory. Optionally, implementing the memory sharing of the first multimedia data between the at least two computing devices via the multi-device buffer object interface may include: creating the shared memory and a device memory of each computing device in a hardware memory via the multi-device buffer object interface, and creating a first memory corresponding to the first multimedia data in the shared memory, such that memory sharing of the first memory and the device memory is implemented.

The multi-device buffer object interface may be an implementation interface for a buffer accessible by various computing devices in the system underlying data structure of the terminal. For example, in the Android system, the multi-device buffer object interface may be AHardwareBuffer. HardwareBuffer is an underlying object of the Android system that may represent a buffer accessible by various computing devices, and is mappable to memories of the computing devices. A HardwareBuffer implementation interface provided in a native service level of the Android system is AHardwareBuffer. This embodiment of the present disclosure uses the Android system as an example, and there may be other implementations in other operating systems.

The hardware memory may be a hardware storage area of the terminal. Specifically, before performing step 101, the multimedia processing apparatus can create the shared memory and the device memory corresponding to each computing device in the hardware memory of the terminal via ClientBuffer corresponding to the multi-device buffer object interface, and then create the first memory corresponding to the first multimedia data in the shared memory. Since the first memory and the device memory of each computing device each are part of the shared memory, memory sharing of the first memory and the device memory is implemented, enabling each computing device to access the first multimedia data in the first memory during subsequent processing.

In the above solution, memory sharing between all the plurality of computing devices in the terminal can be implemented, reducing time consumption and the performance loss caused by memory copying and thus improving the subsequent processing efficiency of the computing devices.

In some embodiments, at least one of the at least two computing devices is configured with a heterogeneous computing architecture, the heterogeneous computing architecture being used for multi-thread parallel processing of the corresponding first data chunk. Optionally, the multimedia processing method may further include: creating a second memory corresponding to the heterogeneous computing architecture of the at least one computing device in the shared memory, such that memory sharing of the second memory, the first memory, and the device memory is implemented.

The heterogeneous computing architecture may be a framework in the computing device that is used to implement heterogeneous parallel data processing, which may be set according to actual situations. For example, the heterogeneous computing architecture may be constructed based on Open Computing Language (OpenCL). OpenCL may be a programming environment for general-purpose parallel programming of a heterogeneous system, and may be a framework for writing program for a heterogeneous platform.

In this embodiment of the present disclosure, a heterogeneous computing framework may be configured in one or more of the at least two computing devices included in the terminal, to implement multi-thread parallel processing of the first data chunk corresponding to a current computing device, thereby improving the processing efficiency. The multimedia processing apparatus can implement, in the shared memory via a shared interface, sharing of the first memory corresponding to the first multimedia data and the second memory corresponding to the heterogeneous computing framework. The shared interface is configured to create the second memory corresponding to the heterogeneous computing framework in the shared memory. Since the second memory and the first memory each are part of the shared memory, the sharing of the second memory and the first memory is implemented. In addition, the first memory is created via the multi-device buffer object interface, and memory sharing of the second memory between the computing devices can be implemented, thereby implementing the memory sharing of the second memory, the first memory, and the device memory.

In the above solution, the heterogeneous computing framework is configured in one or more computing devices of the terminal, so that data processing efficiency of each computing device can be improved, thereby improving the overall processing efficiency of the multimedia data.

In some embodiments, the multimedia processing method may further include: configuring a same image processing algorithm in each computing device, such that the computing device processes the corresponding first data chunk by using the image processing algorithm.

Specifically, before performing step 101, the multimedia processing apparatus can configure the same image processing algorithm in each of the computing devices included in the terminal, such that the computing device subsequently processes the corresponding first data chunk by using the same image processing algorithm.

Figure 3:
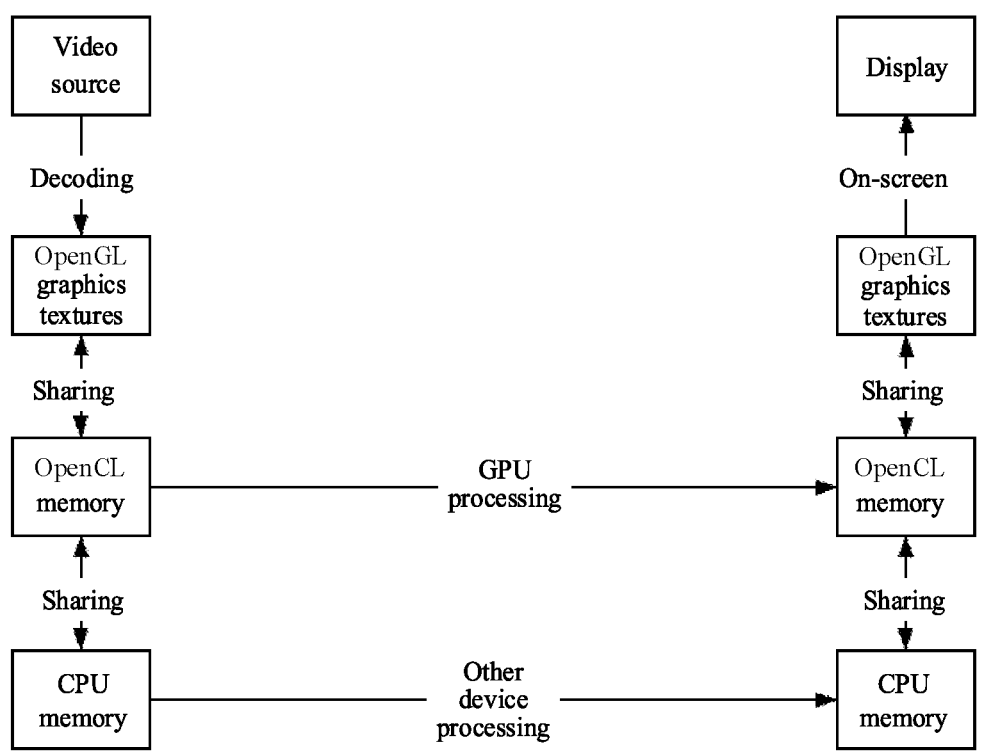
FIG. 3 is a schematic diagram of multimedia processing according to an embodiment of the present disclosure.

The multimedia processing method in this embodiment of the present disclosure is further described below using a specific example. For example, FIG. 3 is a schematic diagram of multimedia processing according to an embodiment of the present disclosure. As shown in FIG. 3, as an example, the system is the Android system, the first multimedia data is the frame data of the video, and the computing devices include a GPU and an NPU, where the GPU is configured with a heterogeneous computing framework of OpenCL. A process of the multimedia processing may include the following steps. The terminal obtains the video from a video source, and the video is decoded by using the GPU, to obtain OpenGL graphics textures, i.e., obtain a plurality of texture images as the frame data of the video. The frame data of the video is stored in the shared memory, and memory sharing of the shared memory of the system underlying data structure and memories of heterogeneous computing frameworks of the GPU, CPU, NPU, and OpenCL described above is implemented in advance. Each frame of data in the video can be obtained by data chunking, and as the computing devices included in the terminal are a GPU and an NPU, each frame of data can be divided into two first data chunks. The two first data chunks are respectively processed in the GPU and the other device (i.e., the NPU) using the super-resolution algorithm, to obtain the two second data chunks, the two second data chunks are both outputted to a specified output memory chunk in the shared memory as processing results, and then the two second data chunks in the output memory chunk can be combined to obtain the second multimedia data, i.e., processed OpenGL graphics textures in the figure. Then, the OpenGL graphics textures can be read by using the CPU and displayed on the screen, i.e., the second multimedia data is displayed on the screen.

The frame data of the video may be obtained through hard decoding processing using the GPU, and used as input data for subsequent algorithm processing. It can be understood that the frame data of the video may be subjected to or not subjected to pre-processing, which may be determined according to actual situations. It can be understood that the processing algorithm is the super-resolution algorithm is used as an example, and other processing algorithms may also be applicable. This solution has a strong correlation with the system underlying structure. The Android system is used as an example in the above description, and different systems may have different implementations.

The input data in the above multimedia processing process may be obtained by performing systematic hard decoding on the video, with resolution equal to the resolution of the processed video. After the decoding, the data can be accessed by the GPU, and the data can also be accessed by other computing devices such as the DSP and the NPU through memory sharing. Then, data chunking can be performed, different data chunks can be processed in different computing devices, and finally an output data result is sent to the GPU and rendered and displayed on the screen. The resolution of output data is higher than that of the video, for example, the resolution of the output data may be twice that of the video.

This solution fully utilizes the computing capabilities of the plurality of computing devices included in the terminal, to complete real-time multimedia processing on the terminal in a heterogeneous parallel manner, which has the advantage of multi-device memory sharing and multi-device parallel computing, and can effectively improve the algorithm operation efficiency and reduce the performance loss.

Figure 4:
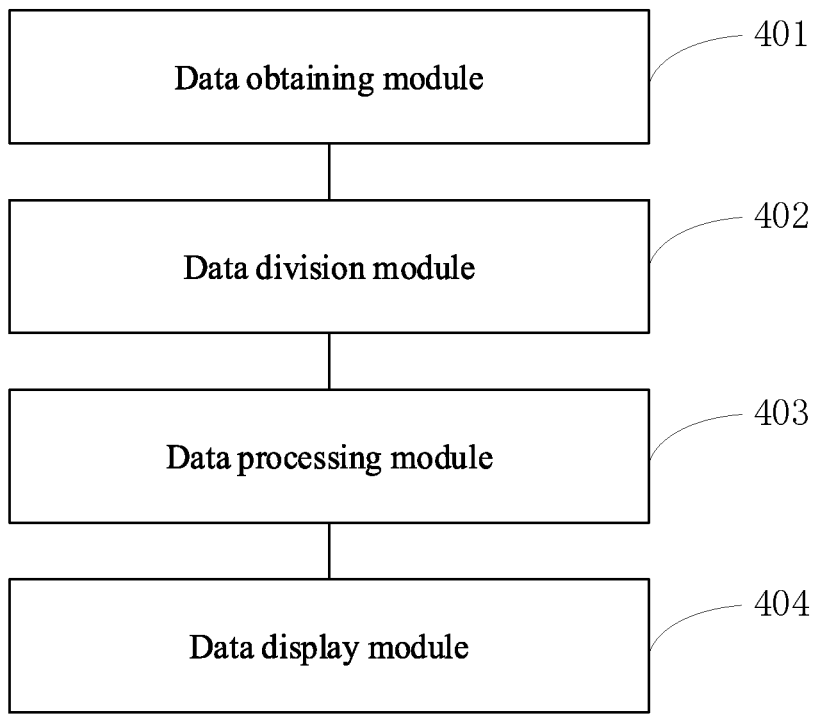
FIG. 4 is a schematic diagram of a structure of a multimedia processing apparatus according to an embodiment of the present disclosure.

FIG. 4 is a schematic diagram of a structure of a multimedia processing apparatus according to an embodiment of the present disclosure. The apparatus may be implemented by software and/or hardware and may generally be integrated into an electronic device. As shown in FIG. 4, the apparatus is configured in a terminal and includes:

a data obtaining module 401 configured to obtain first multimedia data, the first multimedia data including at least one of frame data of a video or an image;

a data division module 402 configured to store the first multimedia data in a shared memory, and divide the first multimedia data into at least two first data chunks, where each of the first data chunks has its memory information in the shared memory;

a data processing module 403 configured to respectively call and process, by using at least two computing devices included in the terminal, the at least two first data chunks based on the memory information of the at least two first data chunks in the shared memory, to obtain at least two second data chunks, where each computing device processes one first data chunk; and a data display module 404 configured to concatenate the at least two second data chunks to obtain second multimedia data, and display the second multimedia data.

Optionally, when the first multimedia data is the frame data of the video, the at least two computing devices each include a graphics processing unit, and the data obtaining module 401 is specifically configured to:

decode the video by using the graphics processing unit, to obtain a plurality of texture images, and determine the plurality of texture images as the frame data.

Optionally, the data division module 402 is specifically configured to:

perform data chunking on the first multimedia data based on memory information of the first multimedia data using a pointer offset method, to obtain the at least two first data chunks, a number of the at least two first data chunks being the same as a number of the at least two computing devices.

Optionally, the memory information of the first multimedia data in the shared memory includes a start position in the shared memory and a data length.

Optionally, the data division module 402 includes:

a chunk length unit configured to determine a chunk length corresponding to each computing device; and a pointer unit configured to perform a pointer offset starting from the start position of the first multimedia data based on the chunk length corresponding to each computing device, and extract a data chunk between two adjacent pointers, to obtain the at least two first data chunks, until a processing length of the first multimedia data is reached.

Optionally, the chunk length unit is configured to:

determine the chunk length corresponding to each computing device as a unit length by equal division, the unit length being a result of dividing the data length of the first multimedia data by the number of the at least two computing devices.

Optionally, the chunk length unit is configured to:

determine, based on a processing speed of each computing device, the chunk length corresponding to the computing device, the processing speed of each computing device being directly proportional to the chunk length.

Optionally, the memory information of each of the first data chunks in the shared memory includes the chunk length and a chunk start position that a pointer is offset to.

Optionally, the apparatus further includes a memory sharing module configured to:

implement memory sharing of the first multimedia data between the at least two computing devices via a multi-device buffer object interface, such that each computing device is capable of accessing the first multimedia data in the shared memory.

Optionally, the memory sharing module is configured to:

create the shared memory and a device memory of each computing device in a hardware memory via the multi-device buffer object interface, and create a first memory corresponding to the first multimedia data in the shared memory, such that memory sharing of the first memory and the device memory is implemented.

Optionally, the apparatus further includes an algorithm configuration module configured to:

configure a same image processing algorithm in each computing device, such that the computing device processes the corresponding first data chunk by using the image processing algorithm.

Optionally, at least one of the at least two computing devices is configured with a heterogeneous computing architecture, the heterogeneous computing architecture being used for multi-thread parallel processing of the corresponding first data chunk.

Optionally, the apparatus further includes a heterogeneous memory module configured to:

create a second memory corresponding to the heterogeneous computing architecture of the at least one computing device in the shared memory, such that memory sharing of the second memory, the first memory, and the device memory is implemented.

The multimedia processing apparatus provided in this embodiment of the present disclosure can perform the multimedia processing method according to any one of the embodiments of the present disclosure, and has corresponding functional modules and beneficial effects for performing the method.

An embodiment of the present disclosure further provides a computer program product, including a computer program/instruction which, when executed by a processor, implements the multimedia processing method according to any one of the embodiments of the present disclosure.

Figure 5:
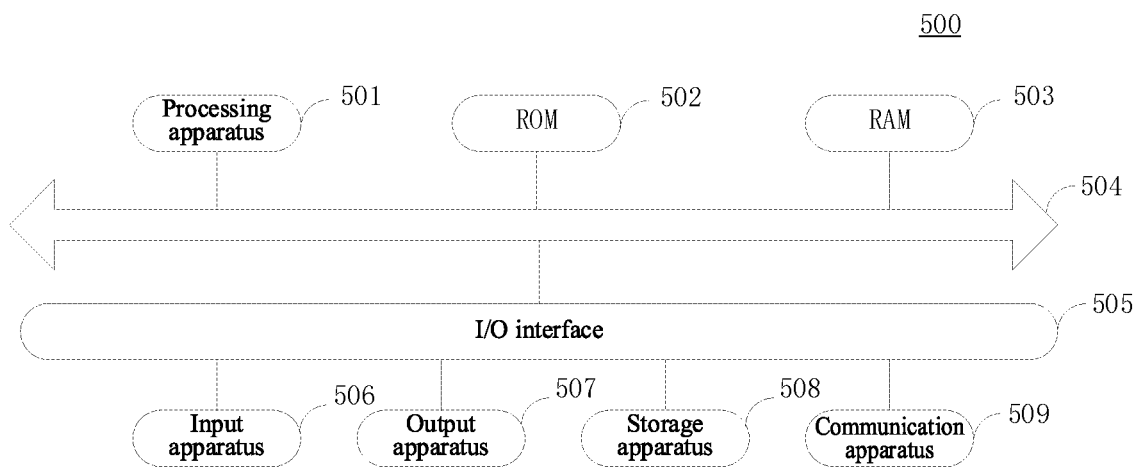
FIG. 5 is a schematic diagram of a structure of an electronic device according to an embodiment of the present disclosure.

FIG. 5 is a schematic diagram of a structure of an electronic device according to an embodiment of the present disclosure. Detailed reference is made to FIG. 5 below, which is a schematic diagram of a structure of an electronic device 500 suitable for implementing an embodiment of the present disclosure. The electronic device 500 in this embodiment of the present disclosure may include, but is not limited to, mobile terminals such as a mobile phone, a notebook computer, a digital broadcast receiver, a personal digital assistant (PDA), a tablet computer (PAD), a portable multimedia player (PMP), and a vehicle-mounted terminal (such as a vehicle navigation terminal), and fixed terminals such as a digital TV and a desktop computer. The electronic device shown in FIG. 5 is merely an example, and shall not impose any limitation on the function and scope of use of the embodiments of the present disclosure.

As shown in FIG. 5, the electronic device 500 may include a processing apparatus (e.g., a central processing unit, a graphics processing unit, etc.) 501 that may perform a variety of appropriate actions and processing in accordance with a program stored in a read-only memory (ROM) 502 or a program loaded from a storage apparatus 508 into a random access memory (RAM) 503. The RAM 503 further stores various programs and data required for the operation of the electronic device 500. The processing apparatus 501, the ROM 502, and the RAM 503 are connected to each other through a bus 504. An input/output (I/O) interface 505 is also connected to the bus 504.

Generally, the following apparatuses may be connected to the I/O interface 505: an input apparatus 506 including, for example, a touch screen, a touchpad, a keyboard, a mouse, a camera, a microphone, an accelerometer, and a gyroscope; an output apparatus 507 including, for example, a liquid crystal display (LCD), a speaker, and a vibrator; a storage apparatus 508 including, for example, a tape, and a hard disk; and a communication apparatus 509. The communication apparatus 509 may allow the electronic device 500 to perform wireless or wired communication with other devices to exchange data. Although FIG. 5 shows the electronic device 500 having various apparatuses, it should be understood that it is not required to implement or have all of the shown apparatuses. It may be an alternative to implement or have more or fewer apparatuses.

In particular, according to an embodiment of the present disclosure, the process described above with reference to the flowcharts may be implemented as a computer software program. For example, an embodiment of the present disclosure includes a computer program product, which includes a computer program carried on a non-transitory computer-readable medium, where the computer program includes program code for performing the method shown in the flowcharts. In such an embodiment, the computer program may be downloaded and installed from a network through the communication apparatus 509, or installed from the storage apparatus 508, or installed from the ROM 502. When the computer program is executed by the processing apparatus 501, the above-mentioned functions defined in the multimedia processing method of the embodiment of the present disclosure are performed.

It should be noted that the above computer-readable medium described in the present disclosure may be a computer-readable signal medium, or a computer-readable storage medium, or any combination thereof. The computer-readable storage medium may be, for example but not limited to, electric, magnetic, optical, electromagnetic, infrared, or semiconductor systems, apparatuses, or devices, or any combination thereof. A more specific example of the computer-readable storage medium may include, but is not limited to: an electrical connection having one or more wires, a portable computer magnetic disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, the computer-readable storage medium may be any tangible medium containing or storing a program which may be used by or in combination with an instruction execution system, apparatus, or device. In the present disclosure, the computer-readable signal medium may include a data signal propagated in a baseband or as a part of a carrier, the data signal carrying computer-readable program code. The propagated data signal may be in various forms, including but not limited to an electromagnetic signal, an optical signal, or any suitable combination thereof. The computer-readable signal medium may also be any computer-readable medium other than the computer-readable storage medium. The computer-readable signal medium can send, propagate, or transmit a program used by or in combination with an instruction execution system, apparatus, or device. The program code contained in the computer-readable medium may be transmitted by any suitable medium, including but not limited to: electric wires, optical cables, radio frequency (RF), etc., or any suitable combination thereof.

In some implementations, the client and the server can communicate using any currently known or future-developed network protocol such as a Hypertext Transfer Protocol (HTTP), and can be connected to digital data communication (for example, communication network) in any form or medium. Examples of the communication network include a local area network ("LAN"), a wide area network ("WAN"), an internetwork (for example, the Internet), a peer-to-peer network (for example, an ad hoc peer-to-peer network), and any currently known or future-developed network.

The above computer-readable medium may be contained in the above electronic device. Alternatively, the computer-readable medium may exist independently, without being assembled into the electronic device.

The above computer-readable medium carries one or more programs, and the one or more programs, when executed by the electronic device, cause the electronic device to perform the following: obtaining first multimedia data, the first multimedia data including at least one of frame data of a video or an image; storing the first multimedia data in a shared memory, and dividing the first multimedia data into at least two first data chunks, where each of the first data chunks has its memory information in the shared memory; respectively calling and processing, by using at least two computing devices included in the terminal, the at least two first data chunks based on the memory information of the at least two first data chunks in the shared memory, to obtain at least two second data chunks, where each computing device processes one first data chunk; and concatenating the at least two second data chunks to obtain second multimedia data, and displaying the second multimedia data.

Computer program code for performing operations of the present disclosure can be written in one or more programming languages or a combination thereof, where the programming languages include but are not limited to object-oriented programming languages, such as Java, Smalltalk, and C++, and further include conventional procedural programming languages, such as "C" language or similar programming languages. The program code may be completely executed on a computer of a user, partially executed on a computer of a user, executed as an independent software package, partially executed on a computer of a user and partially executed on a remote computer, or completely executed on a remote computer or server. In the circumstance involving a remote computer, the remote computer may be connected to a computer of a user over any type of network, including a local area network (LAN) or a wide area network (WAN), or may be connected to an external computer (for example, connected over the Internet using an Internet service provider).

The flowcharts and block diagrams in the drawings illustrate the possibly implemented architecture, functions, and operations of the system, method, and computer program product according to various embodiments of the present disclosure. In this regard, each block in the flowchart or block diagram may represent a module, program segment, or part of code, and the module, program segment, or part of code contains one or more executable instructions for implementing the specified logical functions. It should also be noted that, in some alternative implementations, the functions marked in the blocks may also occur in an order different from that marked in the drawings. For example, two blocks shown in succession can actually be performed substantially in parallel, or they can sometimes be performed in the reverse order, depending on the functions involved. It should also be noted that each block in the block diagram and/or the flowchart, and a combination of the blocks in the block diagram and/or the flowchart may be implemented by a dedicated hardware-based system that executes specified functions or operations, or may be implemented by a combination of dedicated hardware and computer instructions.

The related units described in the embodiments of the present disclosure may be implemented by means of software, or may be implemented by means of hardware. The name of a unit does not constitute a definition of the unit itself in some cases.

The functions described herein above may be performed at least partially by one or more hardware logic components. For example, without limitation, exemplary types of hardware logic components that may be used include: a field programmable gate array (FPGA), an application-specific integrated circuit (ASIC), an application-specific standard product (ASSP), a system-on-chip (SOC) system, a complex programmable logic device (CPLD), and the like.

In the context of the present disclosure, a machine-readable medium may be a tangible medium that may contain or store a program used by or in combination with an instruction execution system, apparatus, or device. A machine-readable medium may be a machine-readable signal medium or a machine-readable storage medium. A machine-readable medium may include, but is not limited to, electronic, magnetic, optical, electromagnetic, infrared, or semiconductor systems, apparatus, or devices, or any suitable combination thereof. More specific examples of a machine-readable storage medium may include an electrical connection based on one or more wires, a portable computer disk, a hard disk, a random access memory (RAM), a read-only memory (ROM), an erasable programmable read-only memory (EPROM or flash memory), an optic fiber, a portable compact disk read-only memory (CD-ROM), an optical storage device, a magnetic storage device, or any suitable combination thereof.

The foregoing descriptions are merely preferred embodiments of the present disclosure and explanations of the applied technical principles. Those skilled in the art should understand that the scope of disclosure involved in the present disclosure is not limited to the technical solutions formed by specific combinations of the foregoing technical features, and shall also cover other technical solutions formed by any combination of the foregoing technical features or equivalent features thereof without departing from the foregoing concept of disclosure. For example, a technical solution formed by a replacement of the foregoing features with technical features having similar functions disclosed in the present disclosure (but not limited thereto) also falls within the scope of the present disclosure.

In addition, although the various operations are depicted in a specific order, it should be understood as requiring these operations to be performed in the specific order shown or in a sequential order. Under certain circumstances, multitasking and parallel processing may be advantageous. Similarly, although several specific implementation details are included in the foregoing discussions, these details should not be construed as limiting the scope of the present disclosure. Some features that are described in the context of separate embodiments can also be implemented in combination in a single embodiment. In contrast, various features described in the context of a single embodiment may alternatively be implemented in a plurality of embodiments individually or in any suitable sub-combination.

Although the subject matter has been described in a language specific to structural features and/or logical actions of the method, it should be understood that the subject matter defined in the appended claims is not necessarily limited to the specific features or actions described above. In contrast, the specific features and actions described above are merely exemplary forms of implementing the claims.

The invention claimed is:

1. A multimedia processing method applied to a terminal, the method comprising:
   obtaining first multimedia data, the first multimedia data comprising at least one of frame data of a video or an image;
   storing the first multimedia data in a shared memory, and dividing the first multimedia data into at least two first data chunks, wherein each of the first data chunks has its memory information in the shared memory;
   respectively calling and processing, by using at least two computing devices comprised in the terminal, the at least two first data chunks based on the memory information of the at least two first data chunks in the shared memory, to obtain at least two second data chunks, wherein each computing device processes one first data chunk; and
   concatenating the at least two second data chunks to obtain second multimedia data, and displaying the second multimedia data.

2. The method according to claim 1, wherein when the first multimedia data is the frame data of the video, and the at least two computing devices each comprise a graphics processing unit, the obtaining first multimedia data comprises:
   decoding the video by using the graphics processing unit, to obtain a plurality of texture images, and determining the plurality of texture images as the frame data.

3. The method according to claim 1, wherein the dividing the first multimedia data into at least two first data chunks comprises:
   performing data chunking on the first multimedia data based on memory information of the first multimedia data using a pointer offset method, to obtain the at least two first data chunks, a number of the at least two first data chunks being the same as a number of the at least two computing devices.

4. The method according to claim 3, wherein the memory information of the first multimedia data comprises a start position in the shared memory and a data length.

5. The method according to claim 4, wherein performing the data chunking on the first multimedia data based on the memory information of the first multimedia data using the pointer offset method, to obtain the at least two first data chunks comprises:
   determining a chunk length corresponding to each computing device; and
   performing a pointer offset starting from the start position of the first multimedia data based on the chunk length corresponding to each computing device, and extracting a data chunk between two adjacent pointers, to obtain the at least two first data chunks, until a processing length of the first multimedia data is reached.

6. The method according to claim 5, wherein determining the chunk length corresponding to each computing device comprises:
   determining the chunk length corresponding to each computing device as a unit length by equal division, the unit length being a result of dividing the data length of the first multimedia data by the number of the at least two computing devices.

7. The method according to claim 5, wherein determining the chunk length corresponding to each computing device comprises:
   determining, based on a processing speed of each computing device, the chunk length corresponding to the computing device, the processing speed of each computing device being directly proportional to the chunk length.

8. The method according to claim 5, wherein the memory information of each of the first data chunks in the shared memory comprises the chunk length and a chunk start position that a pointer is offset to.

9. The method according to claim 1, further comprising:
   implementing memory sharing of the first multimedia data between the at least two computing devices via a multi-device buffer object interface, such that each computing device is capable of accessing the first multimedia data in the shared memory.

10. The method according to claim 9, wherein implementing memory sharing of the first multimedia data between the at least two computing devices via a multi-device buffer object interface comprises:
    creating the shared memory and a device memory of each computing device in a hardware memory via the multi-device buffer object interface, and creating a first memory corresponding to the first multimedia data in the shared memory, such that memory sharing of the first memory and the device memory is implemented.

11. The method according to claim 1, further comprising:
    configuring a same image processing algorithm in each computing device, such that the computing device processes the corresponding first data chunk by using the image processing algorithm.

12. The method according to claim 10, wherein at least one of the at least two computing devices is configured with a heterogeneous computing architecture, the heterogeneous computing architecture being used for multi-thread parallel processing of the corresponding first data chunk.

13. The method according to claim 12, further comprising:
    creating a second memory corresponding to the heterogeneous computing architecture of the at least one computing device in the shared memory, such that memory sharing of the second memory, the first memory, and the device memory is implemented.

14. An electronic device, comprising:
    a processor; and
    a memory configured to store instructions executable by the processor, wherein
    the processor is configured to read the executable instructions from the memory and execute the instructions to implement a multimedia processing method applied to a terminal, the method comprising:
    obtaining first multimedia data, the first multimedia data comprising at least one of frame data of a video or an image;
    storing the first multimedia data in a shared memory, and dividing the first multimedia data into at least two first data chunks, wherein each of the first data chunks has its memory information in the shared memory;
    respectively calling and processing, by using at least two computing devices comprised in the terminal, the at least two first data chunks based on the memory information of the at least two first data chunks in the shared memory, to obtain at least two second data chunks, wherein each computing device processes one first data chunk; and concatenating the at least two second data chunks to obtain second multimedia data, and displaying the second multimedia data.

15. A non-transitory computer-readable storage medium storing a computer program, the computer program being used to perform a multimedia processing method applied to a terminal, the method comprising:

obtaining first multimedia data, the first multimedia data comprising at least one of frame data of a video or an image;

storing the first multimedia data in a shared memory, and dividing the first multimedia data into at least two first data chunks, wherein each of the first data chunks has its memory information in the shared memory;

respectively calling and processing, by using at least two computing devices comprised in the terminal, the at least two first data chunks based on the memory information of the at least two first data chunks in the shared memory, to obtain at least two second data chunks, wherein each computing device processes one first data chunk; and concatenating the at least two second data chunks to obtain second multimedia data, and displaying the second multimedia data.

16. The electronic device according to claim 14, wherein when the first multimedia data is the frame data of the video, and the at least two computing devices each comprise a graphics processing unit, the obtaining first multimedia data comprises:

decoding the video by using the graphics processing unit, to obtain a plurality of texture images, and determining the plurality of texture images as the frame data.

17. The electronic device according to claim 14, wherein the dividing the first multimedia data into at least two first data chunks comprises:

performing data chunking on the first multimedia data based on memory information of the first multimedia data using a pointer offset method, to obtain the at least two first data chunks, a number of the at least two first data chunks being the same as a number of the at least two computing devices.

18. The electronic device according to claim 14, wherein the memory information of the first multimedia data comprises a start position in the shared memory and a data length.

19. The non-transitory computer-readable storage medium according to claim 15, wherein when the first multimedia data is the frame data of the video, and the at least two computing devices each comprise a graphics processing unit, the obtaining first multimedia data comprises:

decoding the video by using the graphics processing unit, to obtain a plurality of texture images, and determining the plurality of texture images as the frame data.

20. The non-transitory computer-readable storage medium according to claim 15, wherein the dividing the first multimedia data into at least two first data chunks comprises:

performing data chunking on the first multimedia data based on memory information of the first multimedia data using a pointer offset method, to obtain the at least two first data chunks, a number of the at least two first data chunks being the same as a number of the at least two computing devices.

* * * * *